L. I. LARSEN.
GRAIN DOOR FOR CARS.
APPLICATION FILED MAR. 8, 1911.
1,039,966.
Patented Oct. 1, 1912.
2 SHEETS—SHEET 1.
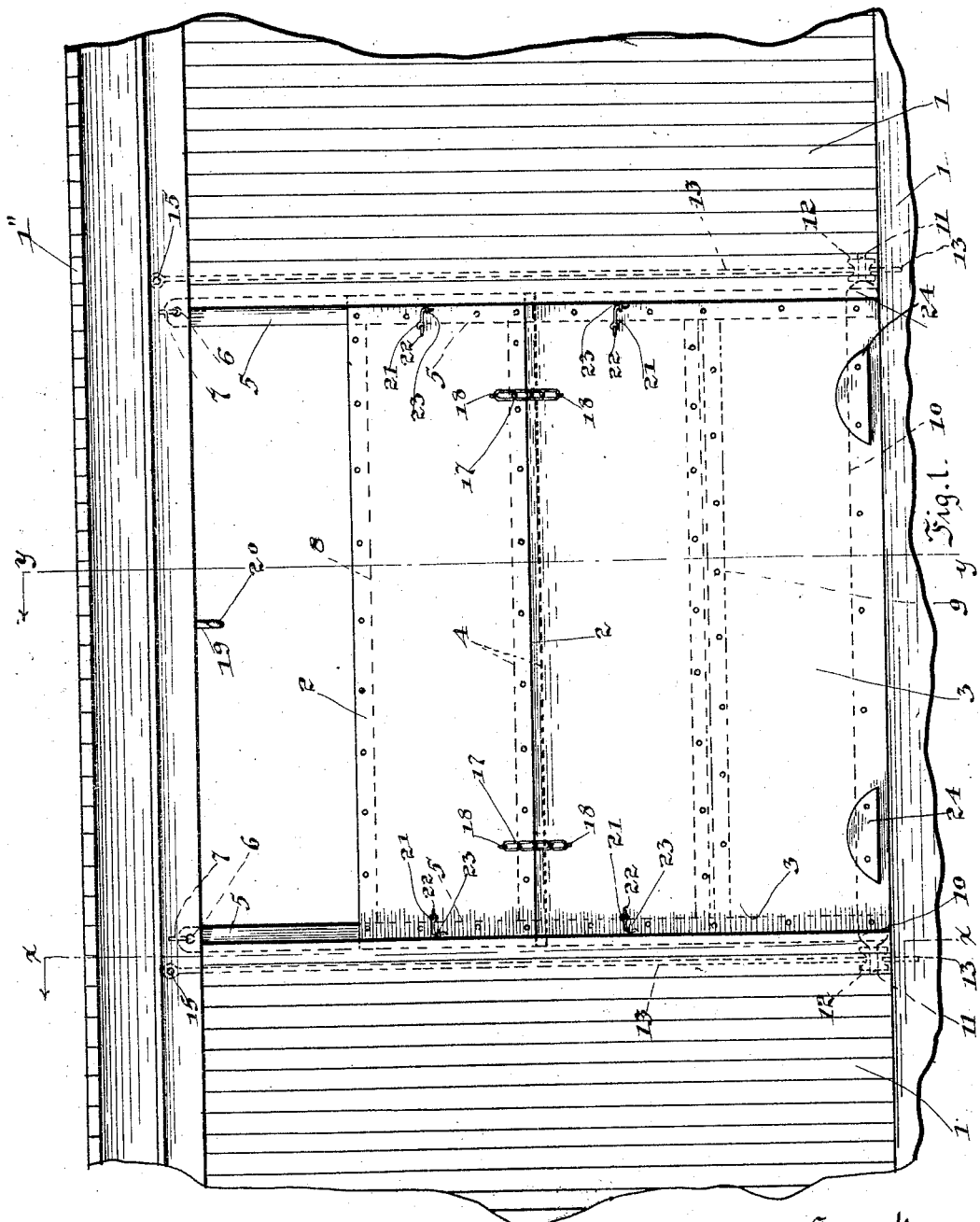

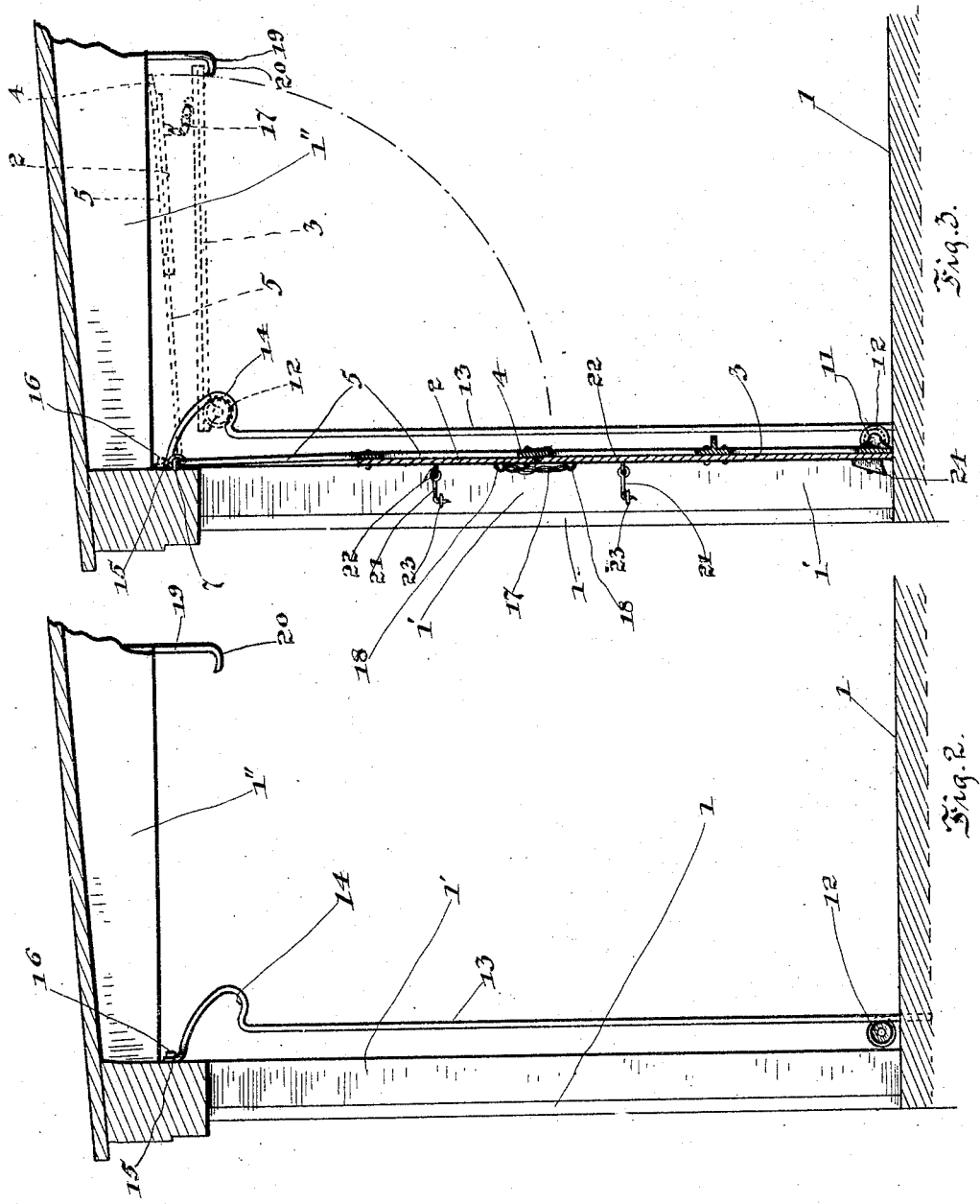

UNITED STATES PATENT OFFICE.

LUDWIG I. LARSEN, OF CHICAGO, ILLINOIS.

GRAIN-DOOR FOR CARS.

1,039,966.   Specification of Letters Patent.   Patented Oct. 1, 1912.

Application filed March 8, 1911. Serial No. 613,102.

*To all whom it may concern:*

Be it known that I, LUDWIG I. LARSEN, a citizen of the United States, residing at Chicago, county of Cook, and State of Illinois, have invented certain new and useful Improvements in Grain-Doors for Cars, of which the following is a specification.

My invention relates to improvements in grain doors for cars and has for its object the provision of an improved grain door of such a construction and conformation as to be capable of manipulation by an ordinary trainman or anyone possessing no unusual degree of skill.

A further object of my invention is to provide a grain door which shall be simple of construction, strong and durable, economical to manufacture, and efficient in operation. Other objects will appear hereinafter.

With these objects in view my invention consists in the novel construction and arrangement of parts hereinafter described and claimed.

My invention will be more readily understood by reference to the accompanying drawings forming a part of this specification, and in which, Figure 1 is a side elevation of a car door embodying my invention, Fig. 2 is a transverse section of the car taken on line $x$—$x$ of Fig. 1, and Fig. 3 is a transverse section of the car and car door taken on line $y$—$y$ of Fig. 1.

The preferred form of construction of my invention comprises a rectangular door opening formed in the side 1 of a car as illustrated in Fig. 1. The door opening is reinforced by the ordinary door posts 1' which extend from the car floor to adjacent the car roof 1''. The two-part grain door comprises upper and lower rectangular elongated metallic sections 2 and 3 respectively, said upper section being provided with a metallic reinforcement 4 which extends below the lower edge of the upper section forming a flange for over-lapping the lower section, as illustrated in Fig. 3. In this manner the joint between the two sections is efficiently closed and prevents the possible leakage of grain. The ends of the upper section 2 are provided with metallic reinforcing strips which extend upwardly forming arms 5 in which eyes 6 are provided at their upper extremities. Staples 7 engage the eyes 6 of the arms 5 and are driven into the side 1 of the car as illustrated in Fig. 3, thus forming a pivotal connection between said arms and the side of the car. From this construction it is clear that the upper section 2 may either assume the vertical full line position as illustrated in Fig. 3 or the dotted elevated position shown in the same figure. The opening between the car roof 1'' and the upper section 2 is provided to give adequate ventilation to the car and for filling the same with grain. The upper section 2 is provided with a horizontally extending metallic reinforcing strip 8 which is riveted to the section as indicated in Fig. 1. The lower section 3 is provided with a medial horizontally extending T-iron reinforcement 9 and with a lower edge metallic reinforcement 10 having laterally projecting journals 11 formed at the ends thereof as indicated by dotted lines in Fig. 1. On these journals are mounted spool shaped rollers 12 which are adapted to guide the lower edge of the section 3 during elevation thereof by traveling over vertically disposed guide-rods 13.

The guide-rods 13 are arranged inside of the door posts 1' and spaced apart therefrom as shown in Figs. 2 and 3. The lower ends of the guide-rods 13 project into the floor of the car and are provided with loops 14 adjacent the upper extremities thereof, said loops forming seats for the rollers 12 as will be clear by reference to Fig. 3. The upper ends of the guide-rods 13 are flattened as at 15 and secured to the inside of the car by means of screws or bolts 15. This construction and arrangement of the lower section 3 obviously permits the same to be raised from the vertical position to an elevated or horizontal position below the elevated position of the section 2.

In order to maintain the adjacent edges of the sections 2 and 3 in proper relation a pair of chains 17 are provided and connected adjacent said edges by means of staples 18. Thus it will be seen that whatever the positions of the sections 2 and 3 that the adjacent edges thereof cannot be removed from each other a distance greater than the length of said chains. In order to lock the sections 2 and 3 in their elevated or horizontal positions as indicated by dotted lines in Fig. 3, a vertical depending rod 19 is provided in the roof 1'' of the car the lower end of which rod is formed into a hook 20 which is adapted to engage the upper edge of the lower section as illustrated. The disposition of the hook 20 is such that when the same engages the upper edge of the section 3 that the rollers 12 will be seated in the loops 14, the conformation of the loops being such that the sections will remain securely held in their elevated positions. When the sections 2 and 3 are in their operative or vertical positions as shown in Figs. 1 and 3 a plurality of latches 21 coact with the pressure of the grain on the inside of the sections for holding them in position. The latches 21 engage eyes 22 and 23 which are secured in the door sections and door posts respectively, this construction being clear by reference to Figs. 1 and 3. In order to open the door against the resistance of the pressure of the grain on the inside thereof a pair of blocks 24 are secured adjacent the lower edge of the section 3 in order that a pry may be used for giving the initial upward movement as will be readily understood by those skilled in the art.

In the operation of opening the door a pry is first used as hereinbefore stated for starting the door under the excessive pressure of the grain. Then the sections are moved upwardly by hand, the blocks 24 serving as handles. It is apparent that with increasing upward movement that pressure of the grain on the interior of the door will be decreased, hence when the sections are near their elevated positions there is substantially no resistance to the movement thereof. After the section 2 has been swung to the elevated or horizontal position and the section 3 moved to a similar position directly under the section 2 the upper edge of the section 3 is engaged with the hook 20, the rollers 12 simultaneously seating in the loops 14, thus completing the operation. To close the door the movements are reversed.

A grain door of the construction set forth possesses the qualities of simplicity and durability to a marked degree, and the same is readily manipulated and highly efficient in its operation.

While I have illustrated and described the preferred construction for carrying my invention into effect this is capable of variation or modification without departing from the spirit of my invention. I, therefore, do not wish to limit myself to the precise details of construction as set forth but desire to avail myself of such variations and modifications as come within the scope of the appended claims.

Having described my invention what I claim as new and desire to secure by Letters Patent is:

1. The combination with a car, of a two-part grain door consisting of upper and lower sections, the upper of said sections being permanently hinged to swing from a vertical to a horizontal position adjacent the roof of said car; a flexible connection between the meeting edges of said sections permitting of pivotal and bodily movements of said sections relatively to each other; guide members for said lower section having an inwardly extending and downwardly curved seat at its upper end; members on the lower end of said lower section running in said guide members and seating in said seat; and means for locking said sections in folded position adjacent the roof of the car, substantially as described.

2. The combination with a car, of a two-part grain door consisting of upper and lower sections, the upper of said sections being hinged to swing from a vertical to a horizontal position adjacent the roof of the car; flexible connections between the meeting edges of said sections permitting of pivotal and bodily movements of said sections relatively to each other; guide members for said lower section arranged at each side thereof and having an inwardly extending downwardly curved seat at its upper end; rollers on the lower end of said lower section running in said guide members and seating in said seats; and a hook member secured to the roof of the car and adapted to hold said door sections in folded positions adjacent the roof of the car, substantially as described.

3. The combination with a car having an opening therein; of vertical rods spaced from the side of said car and located upon each side of said opening, the upper terminals of said rods being curved inwardly and downwardly to form seats; a two-part grain door consisting of an upper and a lower section; a flexible connection between said sections; rollers carried by the bottom section for engagement with the rods aforesaid and adapted to rest in the inwardly curved and downwardly extending seats formed in said rods when said door is raised; and vertical rods or bars secured to the vertical sides of the upper section and constituting a permanent pivot adjacent to the top of said opening, said upper section adapted to swing adjacent to the roof of the car and said lower section adapted to be raised and rest in spaced relation thereto.

4. A grain door comprising upper and lower sheet metal sections having metallic reinforcements on the edges thereof, a pair of chains for attaching the lower edge of the upper section to the upper edge of the lower section, a pair of arms extending upwardly from the ends of said upper section and pivotally mounted on the side of the car so as to permit of the upper section swinging from a vertical to a horizontal position, a pair of rollers mounted at the lower corners of said lower section and projecting laterally therefrom, a pair of vertical guide-rods on which said rollers are adapted to travel said sections being adapted to assume adjacent horizontal positions under the roof of the car, and a hook engaging the lower section for locking both of said sections in the horizontal or elevated positions, substantially as described.

In testimony whereof I have signed my name to this specification in the presence of two subscribing witnesses.

LUDWIG I. LARSEN.

Witnesses:
HELEN F. LILLIS,
JOSHUA R. H. POTTS.

Copies of this patent may be obtained for five cents each, by addressing the "Commissioner of Patents, Washington, D. C."